Patented May 20, 1941

2,242,208

UNITED STATES PATENT OFFICE 2,242,208

RUBBER ACCELERATOR AND ACTIVATOR

Arnold R. Davis, Old Greenwich, Conn., assignor to American Cyanamid Company, New York, N. Y., a corporation of Maine No Drawing. Application August 5, 1938, Serial No. 223,206

10 Claims. (Cl. 260—782)

This invention relates to the vulcanization of rubber and more particularly to the control of the activity of accelerators employed in the vulcanization.

The use of sulphur-containing accelerators such as mercaptobenzothiazole and benzothiazyl disulphide in the vulcanization of rubber is well known. It is likewise known that such materials or chemical compounds which will hydrolyze to produce thio acids or mercaptans, will become more effective in the presence of basic materials such as diphenyl guanidine, di-ortho-tolyl guanidine, phenyl ortho-tolyl-guanidine and the like. These activated accelerators, however, not only are effective at the normal vulcanizing temperatures, but also are apt to initiate vulcanization during preliminary treatment, such as milling, calendering, extruding, etc. prior to the desired vulcanizing, and they even may cause premature vulcanization during storage.

One of the objects of this invention is to produce an activator for a sulphur-bearing accelerator, which will have a slower rate of set-up than the diaryl guanidines, such as diphenyl guanidine, for example.

I have found that zinc chloride will act as a retarder for diaryl guanidines, and I have further found that the product obtained by evaporating an alcoholic solution containing two mols of diaryl guanidine and one mol of zinc chloride is an excellent retarded activator. The complex addition product obtained by the evaporation of the alcoholic solutions of the salt mixture possesses the additional advantage over the use of a simple mixture containing zinc chloride, in that it is not hygroscopic.

The following examples illustrate the method of preparation of my complex addition product activator and its effect on the vulcanizing process.

Example 1

An alcoholic solution containing 422 grams (2 mols) of diphenyl guanidine was made up, and to this solution was added 136.4 grams (1 mol) of zinc chloride, which had likewise been previously dissolved in alcohol. The combined solutions were heated slowly to evaporate off the alcohol and yet avoid overheating. The product obtained upon evaporation to dryness was a clear resin-like amorphous mass, which powdered up readily, and showed no hygroscopic properties. This powder softened when heated to above 84° C.

To test the utility of the diphenyl guanidine-zinc chloride complex, the following samples were made up and tested. Equivalent ratios of the complex material and diphenyl guanidine alone were used in the samples.

| | Sample A | Sample B |
|---|---|---|
| Smoked rubber sheets | 100 | 100 |
| Zinc oxide | 6 | 6 |
| Sulphur | 3 | 3 |
| Benzothiazyl disulphide | 0.75 | 0.75 |
| Diphenyl guanidine | | 0.445 |
| Diphenyl guanidine.ZnCl$_2$ combination | 0.59 | |

These samples were then tested with the Williams plastometer for the "$y$" value using the three minute "$y$" value at 100° C. The higher the percentage change in the "$y$" value on heating, the faster the rate of set up or premature vulcanization.

| | Williams 3 min. "$y$" at 100° C. | | Change | |
|---|---|---|---|---|
| | A | B | A | B |
| | | | Percent | Percent |
| After mixing | .069 | .073 | | |
| After 1.5 hours at 85° C. in water | .078 | .194 | +13.1 | +166 |
| After 2.0 hours at 85° C. in water | .133 | .297 | +93 | +307 |

From the above table it may readily be seen that diphenyl guanidine alone has a much faster rate of premature vulcanization than my new diphenyl guanidine-zinc chloride combination.

The following tests were then run to show the comparative effects of my new product and of diphenyl guanidine on the samples at full cure.

| | A | B |
|---|---|---|
| 10 min./130° C.: | | |
| Stress in lbs./sq. in. at 500% elongation | 875 | 1135 |
| Tensile strength at break | 5050 | 5485 |
| Percent elongation | 795 | 780 |
| 25 min./130° C.: | | |
| Stress in lbs./sq. in. at 500% elongation | 1570 | 1630 |
| Tensile strength at break | 4985 | 5185 |
| Percent elongation | 695 | 690 |
| 40 min./130° C.: | | |
| Stress in lbs./sq. in. at 500% elongation | 1700 | 1925 |
| Tensile strength at break | 4610 | 4560 |
| Percent elongation | 690 | 660 |

From the above tests it may be seen that the physical properties of the two samples were practically the same at full cure.

Example 2

To show the retarding effect of other diaryl guanidine complex salts and other zinc salts in combination with diaryl guanidines, rubber stocks were compounded in the usual manner using di-ortho-tolyl guanidine-zinc chloride complex, and the addition product of diphenyl guanidine and zinc oxalate.

The di-ortho-tolyl guanidine-zinc chloride complex was made in the same manner as the diphenyl complex with the mere substitution of di-ortho-tolyl guanidine for diphenyl guanidine. The diphenyl guanidine-zinc oxalate complex was made by adding to an alcoholic solution containing 90 grams (1 mol) of oxalic acid and 40.7 grams (0.5 mol) of zinc oxide in suspension, an alcoholic solution containing 211 grams (1 mol) of diphenyl guanidine. The combined solutions were then heated to evaporate off the alcohol.

Rubber stock was then compounded, using equivalent quantities of my improved activators, in the usual manner.

|  | C | D | E |
|---|---|---|---|
| Smoked sheets | 100 | 100 | 100 |
| Zinc oxide | 6 | 6 | 6 |
| Sulphur | 3 | 3 | 3 |
| Benzothiazyl disulphide | 0.75 | 0.75 | 0.75 |
| (Diphenyl guanidine)$_2$.ZnCl$_2$ | 0.59 | | |
| (Di-o-tolyl guanidine)$_2$.ZnCl$_2$ | | 0.40 | |
| (Diphenyl guanidine)$_1$.(H$_2$C$_2$O$_4$)$_1$.(ZnO)$_{1/2}$ | | | 0.78 |

These samples were then tested to show their comparative premature vulcanization in the same manner as the samples in Example 1.

| | Williams 3 min. "y" at 100° C. | | | Change | | |
|---|---|---|---|---|---|---|
| | C | D | E | C | D | E |
| | | | | Pct. | Pct. | Pct. |
| After mixing | 0.64 | 0.67 | 0.73 | | | |
| After 1.5 hours at 85° C. in water | 0.72 | 0.69 | 0.78 | 12.5 | 3.0 | 6.8 |
| After 2.0 hours at 85° C. in water | 1.00 | 0.75 | 1.14 | 56.3 | 11.9 | 56.3 |

This showed that the di-ortho-tolyl guanidine in combination with zinc chloride gave an even slower rate of set up, or premature vulcanization, than the diphenyl guanidine complex. On the other hand the change from zinc chloride to zinc oxalate made very little change in the rate of set-up.

The advantages obtained by the use of acidic zinc salts, such as zinc chloride, zinc acetate, zinc oxalate, zinc maleate and the like, combined with diaryl guanidines are obvious. By a proper selection of the zinc salt and the particular aryl guanidine used, the amount of activation given the accelerator may be controlled. The combined salts, in addition to being non-hygroscopic, are readily compounded with the rubber stock, whereas the zinc salts per se are not. The particular activator chosen according to my invention will, of course, depend upon the strength of the accelerator with which it is to be used, as is readily apparent to those skilled in the art. According to my invention the proper activation may be given to a vulcanization accelerator, and yet the hazards of premature vulcanization during processing are eliminated.

While I have found that any acidic zinc salt will serve to control the diaryl guanidine accelerators, I prefer to use zinc chloride because of its greater economy, ready solubility in alcohol, and effectiveness as a retarder. These zinc salts may be combined with any diaryl guanidine as diphenyl guanidine, di-ortho-tolyl guanidine, phenyl ortho-tolyl guanidine and the like in the form of a complex addition product to form the activator, the zinc salt complex being formed by the evaporation of the alcoholic solutions of the salt mixtures in the manner specifically given in the examples.

The improved activators which form the subject matter of my invention are of utility with any vulcanization accelerator capable of being activated by diaryl guanidines, and particularly the sulfur-containing accelerators.

Any suitable changes may be made in carrying out my invention without departing from the spirit and scope thereof.

I claim:

1. The process of producing a vulcanizable rubber composition which comprises incorporating with the rubber a vulcanizing agent, a diaryl guanidine, activatable organic accelerator, and the non-hygroscopic resin-like, amorphous addition product of zinc chloride and a diaryl guanidine.

2. The process of producing a vulcanizable rubber composition which comprises incorporating with the rubber a vulcanizing agent, a diaryl guanidine activatable sulfur-containing accelerator, and the non-hygroscopic resin-like, amorphous addition product of zinc chloride and a diaryl guanidine.

3. The process of producing a vulcanizable rubber composition which comprises incorporating with the rubber a vulcanizing agent, a diaryl guanidine activatable sulfur-containing accelerator, and the complex non-hygroscopic resin-like, amorphous addition product of zinc chloride and diphenyl guanidine.

4. The process of producing a vulcanizable rubber composition which comprises incorporating with the rubber a vulcanizing agent, a diaryl guanidine activatable sulfur-containing accelerator, and the complex non-hygroscopic resin-like, amorphous addition product of zinc chloride and di-ortho-tolyl guanidine.

5. Rubber having incorporated therein a diaryl guanidine activatable sulfur-containing accelerator and the complex non-hygroscopic resin-like, amorphous addition product of zinc chloride and diphenyl guanidine.

6. Rubber having incorporated therein a diaryl guanidine activatable sulfur-containing accelerator and the complex non-hygroscopic resin-like, amorphous addition product of zinc chloride and di-ortho-tolyl guanidine.

7. A vulcanizable rubber composition comprising a vulcanizing agent, a diaryl guanidine activatable organic accelerator, and the non-hygroscopic resin-like, amorphous addition product of zinc chloride and a diaryl guanidine.

8. A vulcanizable rubber composition comprising a vulcanizing agent, a diaryl guanidine activatable sulfur-containing accelerator and the non-hygroscopic resin-like, amorphous addition product of zinc chloride and a diaryl guanidine.

9. A rubber composition which is the vulcanization product of a mixture comprising rubber, a vulcanizing agent, a diaryl guanidine activatable organic accelerator, and the non-hygroscopic resin-like, amorphous addition product of zinc chloride and a diaryl guanidine.

10. A rubber composition which is the vulcanization product of a mixture comprising rubber, a vulcanizing agent, a diaryl guanidine activatable sulfur-containing accelerator, and the non-hygroscopic resin-like, amorphous addition product of zinc chloride and a diaryl guanidine.

ARNOLD R. DAVIS.

CERTIFICATE OF CORRECTION.

Patent No. 2,242,208.                                              May 20, 1941.

ARNOLD R. DAVIS.

It is hereby certified that error appears in the printed specification of the above numbered patent requiring correction as follows: Page 2, second column, line 18, claim 1, after the word "guanidine" strike out the comma; and that the said Letters Patent should be read with this correction therein that the same may conform to the record of the case in the Patent Office.

Signed and sealed this 17th day of June, A. D. 1941.

(Seal)

Henry Van Arsdale,
Acting Commissioner of Patents.